(12) United States Patent
Butler et al.

(10) Patent No.: US 11,176,635 B2
(45) Date of Patent: Nov. 16, 2021

(54) AUTOMATIC PROGRAMMING OF SOLDER PASTE INSPECTION SYSTEM

(71) Applicant: CyberOptics Corporation, Golden Valley, MN (US)

(72) Inventors: Douglas G. Butler, St. Louis Park, MN (US); Carl E. Haugan, St. Paul, MN (US)

(73) Assignee: CyberOptics Corporation, Golden Valley, MN (US)

( * ) Notice: Subject to any disclaimer, the term of this patent is extended or adjusted under 35 U.S.C. 154(b) by 449 days.

(21) Appl. No.: 14/160,864

(22) Filed: Jan. 22, 2014

(65) Prior Publication Data

US 2014/0210993 A1   Jul. 31, 2014

Related U.S. Application Data

(60) Provisional application No. 61/756,664, filed on Jan. 25, 2013.

(51) Int. Cl.
*G01N 23/18* (2018.01)
*G06T 3/00* (2006.01)
(Continued)

(52) U.S. Cl.
CPC .............. *G06T 3/00* (2013.01); *G06K 9/6255* (2013.01); *G06T 7/001* (2013.01); *G06T 2207/30141* (2013.01)

(58) Field of Classification Search
CPC ...... H05K 1/0269; H05K 3/3463; H05K 3/34; H05K 3/1216; G01N 2021/95646;
(Continued)

(56) References Cited

U.S. PATENT DOCUMENTS 5,709,905 A * 1/1998 Shaw ................... H05K 3/1233
101/129
5,752,446 A * 5/1998 Squibb ................ B41F 33/0081
101/126
(Continued)

FOREIGN PATENT DOCUMENTS

JP            4618085 B2 *  1/2011  ............... H05K 3/34
WO      WO0038494 A2     6/2000
(Continued)

OTHER PUBLICATIONS

Search Report and Written Opinion for International Application No. PCT/US2014/012710, dated May 13, 2014. 12 pages.
(Continued)

*Primary Examiner* — Patrick E Demosky
(74) *Attorney, Agent, or Firm* — Christopher R. Christenson; Kelly, Holt & Christenson PLLC

(57) ABSTRACT

A system for measuring solder paste stencil aperture positions and sizes is provided. The system includes at least one camera configured to acquire images of the stencil and an alignment target. A motion system generates relative motion between the at least one camera and the stencil. A controller is coupled to and controls the motion system. The controller is configured to analyze the images to generate aperture information relative to the stencil. The aperture information is provided to automatically program a solder paste inspection system. Other features and benefits that characterize embodiments of the present invention will be apparent upon reading the following detailed description and review of the associated drawings.

17 Claims, 7 Drawing Sheets

(51) Int. Cl.
*G06T 7/00* (2017.01)
*G06K 9/62* (2006.01)
(58) Field of Classification Search
CPC ....... G01N 21/956; G01N 2021/95638; G01N 23/18; G01N 21/8806; G01N 21/95684; G06T 2207/30141; G06T 2207/30152; G06T 7/0004; G06T 3/00; G06T 7/001; G06T 2207/30148; G06T 2207/10061; G06T 2207/10056; G06K 9/6255
See application file for complete search history.

(56) References Cited

U.S. PATENT DOCUMENTS

| | | | | |
|---|---|---|---|---|
| 5,882,720 | A * | 3/1999 | Legault | H05K 3/1233 228/102 |
| 6,317,513 | B2 * | 11/2001 | Michael | B23K 3/08 382/145 |
| 6,352,025 | B1 | 3/2002 | Neiconi et al. | |
| 6,610,991 | B1 | 8/2003 | Case | |
| 6,750,899 | B1 * | 6/2004 | Fishbaine | G01B 11/2518 348/126 |
| 2002/0143416 | A1 * | 10/2002 | Seshan | H05K 13/0469 700/95 |
| 2003/0021886 | A1 | 1/2003 | Baele | |
| 2003/0027363 | A1 * | 2/2003 | Kodama | G05B 19/4065 438/14 |
| 2003/0113008 | A1 * | 6/2003 | Schanz | B41M 1/12 382/141 |
| 2003/0201303 | A1 | 10/2003 | Jones et al. | |
| 2004/0159787 | A1 | 8/2004 | Nakasuji et al. | |
| 2004/0218808 | A1 | 11/2004 | Prince | |
| 2004/0244613 | A1 * | 12/2004 | Barajas | H05K 3/1233 101/130 |
| 2006/0200332 | A1 | 9/2006 | Ishimoto et al. | |
| 2006/0205112 | A1 | 9/2006 | Standing et al. | |
| 2007/0102477 | A1 | 5/2007 | Prince | |
| 2007/0102478 | A1 | 5/2007 | Prince | |
| 2007/0175343 | A1 | 8/2007 | Prince | |
| 2007/0230770 | A1 * | 10/2007 | Kulkarni | H01L 21/67005 382/149 |
| 2008/0156207 | A1 * | 7/2008 | Ellenbogen | H05K 3/1216 101/126 |
| 2008/0197170 | A1 * | 8/2008 | Prince | G01N 21/8806 228/103 |
| 2008/0250950 | A1 | 10/2008 | Doyle | |
| 2008/0250951 | A1 | 10/2008 | Klauser et al. | |
| 2009/0205518 | A1 | 8/2009 | Doyle et al. | |
| 2010/0007896 | A1 * | 1/2010 | Fishbaine | G01N 21/8806 356/603 |
| 2010/0206189 | A1 * | 8/2010 | Moncavage | B41F 15/40 101/129 |
| 2011/0102575 | A1 * | 5/2011 | Case | G01N 21/8806 348/87 |
| 2011/0222655 | A1 * | 9/2011 | Murakami | G01N 23/18 378/54 |
| 2012/0145013 | A1 | 6/2012 | Doyle | |
| 2012/0145014 | A1 | 6/2012 | Doyle | |
| 2012/0145015 | A1 | 6/2012 | Doyle | |
| 2012/0145016 | A1 | 6/2012 | Doyle | |
| 2012/0327215 | A1 * | 12/2012 | Case | G01N 21/8806 348/92 |
| 2013/0177698 | A1 * | 7/2013 | Cherbis | H05K 3/22 427/8 |
| 2013/0199386 | A1 | 8/2013 | Lynch et al. | |
| 2014/0000468 | A1 | 1/2014 | Perault et al. | |
| 2014/0272103 | A1 | 9/2014 | Prince | |
| 2014/0366756 | A1 | 12/2014 | Gray | |
| 2015/0033966 | A1 | 2/2015 | Ong et al. | |
| 2015/0045927 | A1 * | 2/2015 | Haugen | B25J 9/1682 700/109 |

FOREIGN PATENT DOCUMENTS

| | | |
|---|---|---|
| WO | WO02097534 A2 | 12/2002 |
| WO | WO2008100646 A2 | 8/2008 |

OTHER PUBLICATIONS

Non-Final Office Action for U.S. Appl. No. 14/452,868 dated Jan. 11, 2017, 20 pages.

* cited by examiner

AUTOMATIC PROGRAMMING OF SOLDER PASTE INSPECTION SYSTEM

CROSS-REFERENCE TO RELATED APPLICATION

This application claims the benefit of U.S. Provisional Application 61/756,664, filed on Jan. 25, 2013, the content of which is hereby incorporated by reference in its entirety.

COPYRIGHT RESERVATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Circuit boards that carry electronic integrated circuits and discrete electronic components are well known. A circuit board substrate is prepared with predetermined conductor paths and pads for receiving the leads of electronic components such as integrated circuit chips, resistors or capacitors. During the circuit board assembly process, solder paste deposits are placed onto the board substrate at appropriate positions. The solder paste deposits are usually applied by placing a stencil screen onto the substrate, applying solder paste through the stencil openings and removing the stencil from the substrate. The circuit board electronic components are then positioned onto the substrate, preferably with a pick and place machine, with leads of the electronic components placed on the respective solder paste deposits. The circuit board is passed through an oven after all of the components are positioned on the substrate to melt the solder paste deposits thus creating an electrical as well as mechanical connection between the components and the substrate.

The size of the solder paste deposits and electronic components and the accuracy with which they must be placed on the substrate has become increasingly smaller and tighter with the increased emphasis on miniaturization in the electronics industry. Solder paste deposit heights can be as small as 50 microns and the height of the solder paste brick must often be measured to within 1 percent of the designed height and size. The center-to-center spacing between solder bricks is sometimes as little as 200 microns. Too little solder paste can result in no electrical connection between the lead of an electronic component and the pad of the circuit board substrate. Too much paste can result in bridging and short-circuiting between the leads of a component. Discrete electronic components such as resistors and capacitors can be as small as 200×400 microns and leads on micro ball grid array components can have a center-to-center spacing less than 300 microns.

A single circuit board can cost thousands and even tens of thousands of dollars to manufacture. Testing of a circuit board after the fabrication process is complete can detect errors in solder paste placement and component placement and lead connection, but often the only remedy for a faulty board is rejection of the entire board. In addition, with the miniaturization of components, visual inspection of the circuit board, even with optical magnification, is unreliable. It is accordingly imperative that a circuit board be inspected during the fabrication process so that improper solder paste deposits can be detected prior to the placement of the electronic components onto the substrate. Such in-process solder inspection reduces the cost of failure since expensive components have not yet been placed onto the circuit board.

When inspecting solder paste deposits, the inspection system compares the measured deposit position, shape, height, area, and volume with expected values. An example of such an automated solder paste inspection system is shown in U.S. Pat. No. 6,750,899, assigned to the assignee of the present invention. If the measured values are out of acceptable ranges, the build process may be stopped and corrective action taken. Solder paste inspection may be carried out in accordance with any suitable known techniques, such as those set forth in the '899 patent. A difficulty with the inspection process is that it requires information about the expected characteristics of the solder deposit; ideally this information is supplied by the PCB designer in a machine readable Computer Aided Design (CAD) file. For the solder paste inspection process the important portion of the CAD data describes the printing stencil, the CAD file describes the shape and position of each aperture in the stencil. Print height (and expected volume) is controlled by the thickness of the stencil (typically a metal sheet about 0.1 mm thick) and configuration of the printer (e.g. squeegee pressure). The CAD file must be converted into an aperture list before use in Solder Paste Inspection (SPI). This process is often problematic, time consuming, and involves many steps to extract aperture information from a CAD file. A number of problems can occur. For example, the file itself may be corrupt; user errors can result in errors during extraction of apertures from the file; and/or the CAD file itself, even though valid, may be for a different version of the circuit board. When the CAD file is for an incorrect versions of the PCB, the pattern will look correct but may have very difficult to detect inconsistencies between the stencil apertures and the extracted aperture list. Additionally, in many instances the CAD data is simply not available to the facility assembling the circuit board.

SUMMARY

A system for measuring solder paste stencil aperture positions and sizes is provided. The system includes at least one camera configured to acquire images of the stencil and an alignment target. A motion system generates relative motion between the at least one camera and the stencil. A controller is coupled to and controls the motion system. The controller is configured to analyze the images to generate aperture information relative to the stencil. The aperture information is provided to automatically program a solder paste inspection system. Other features and benefits that characterize embodiments of the present invention will be apparent upon reading the following detailed description and review of the associated drawings.

DETAILED DESCRIPTION OF ILLUSTRATIVE EMBODIMENTS

Embodiments of the present invention generally leverage the solder paste printing stencil itself to automatically generate solder paste inspection information. This is particularly useful to eliminate the time consuming step of extracting the aperture information from a CAD file, or when the original CAD information for the stencil is unavailable, corrupted, or for the wrong board. By its nature, the stencil contains the important information required to inspect the solder paste deposits. All that is required is generation of CAD information from the hole pattern in the stencil. This CAD information can be extracted or otherwise generated using cameras already present in most solder paste printing machines. A typical solder paste printing machine includes a camera which can be moved into the gap between the stencil and PCB. A typical example is that sold under the trade designation model CBA40 board align camera, available from CyberOptics Corporation of Golden Valley, Minn. This imaging device includes an upward camera and illuminator (which can view the stencil) and a downward camera and illuminator (which can view the PCB). The primary use of this imaging device is to facilitate alignment of the stencil to the PCB prior to printing. An auxiliary usage of the CBA40 is to inspect post print paste deposits.

Figure 1:
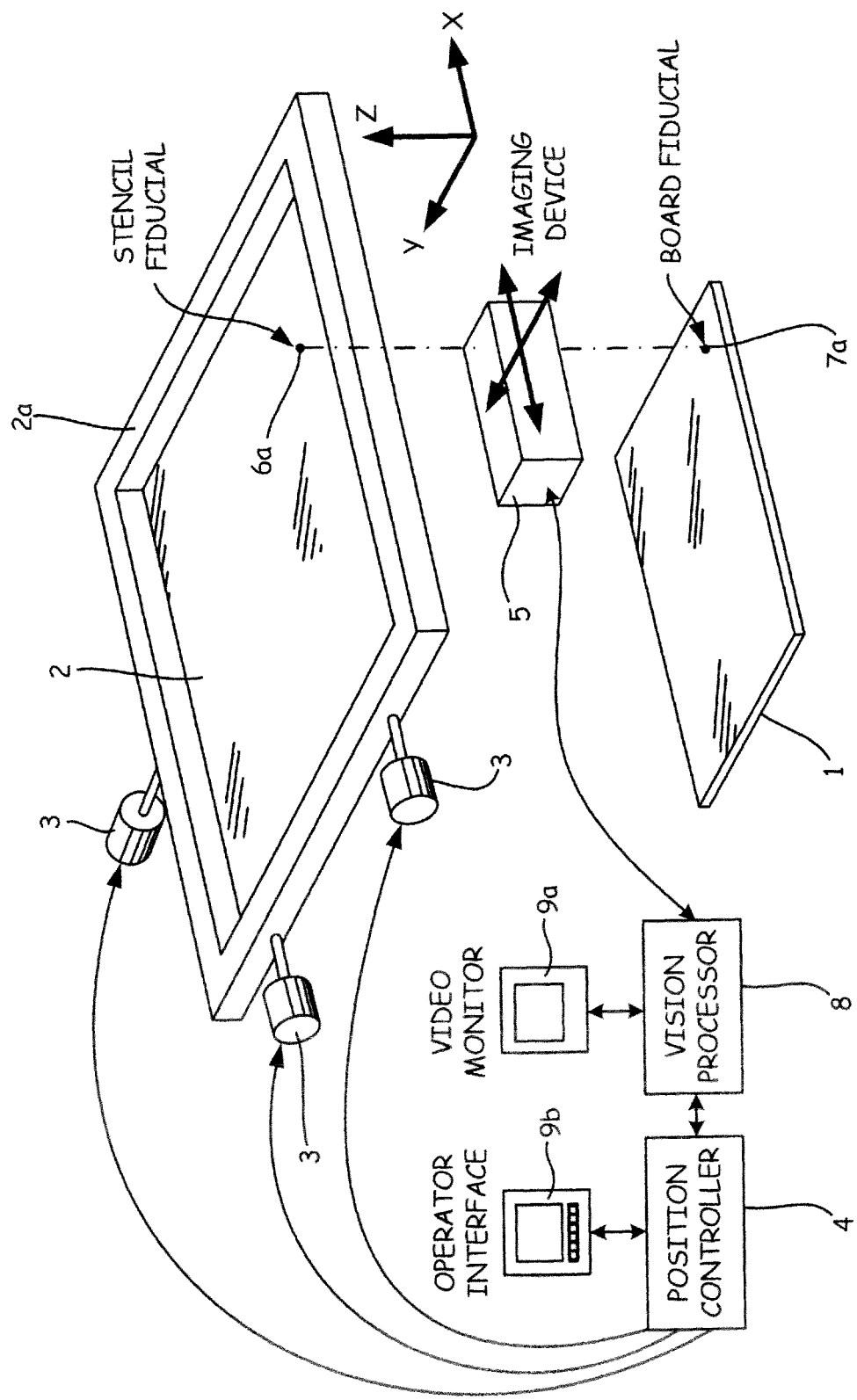
FIG. 1 is a diagram of a typical solder paste printer showing the relative positions of the stencil, the PCB to be printed, and the movable imaging device.

FIG. 1 is a diagram of a typical solder paste printer showing the relative positions of the stencil 2, the PCB 1 to be printed, and the imaging device 5, which includes both upward and downward cameras. Imaging device 5 is typically movable relative to frame 2a, or vice versa using known motion control elements. The system generally includes a controller or vision processor 8 that is coupled to imaging device 5. Vision processor 8 is coupled to position controller 4 and thus is able to generate relative motion between imaging device 5 and stencil 2.

The vision processor 8 is coupled to a video monitor 9a allowing a technician to view the images from the cameras while the alignment between the stencil and the board is adjusted. Such adjustment can be performed by the technician via operator interface 9b which is coupled to stencil position controller 4. Position controller 4 is coupled to motion control elements 3, such as stepper motors, which generally set or otherwise determine the x-y position of the stencil relative to the board as well as the rotational orientation of the stencil about the z axis relative to board 1.

The typical alignment use of imaging device 5 does not require precise motion. Therefore the motion system used to move the imaging device about is relatively imprecise. Alignment is generally accomplished by viewing upward and downward images from the respective upward and downward cameras within imaging device 5 until stencil fiducial 6a and board fiducial 7a are located in correct regions on the monitor 9a and/or overlap on a single display. Alternatively, vision processor 8 can calculate the offset between stencil fiducials 6 in the upward view and the board fiducials 7 in the downward view and then send a correction signal to position controller 4 to automatically adjust alignment of stencil 2 relative to board 1. In the embodiment shown in FIG. 1, vision processor 8 and position controller 4 are shown as separate elements. However, embodiments of the present invention can be practiced where a single processor or controller provides the functions of both. An imprecise motion system saves significant cost but prevents precise measurement of positions using images captured by the cameras. In many instances, the motion system is less accurate than the dimensions of the smallest stencil aperture. If the precise position of the camera could be determined, then the images of the stencil apertures could be used to build a database of aperture positions, sizes, and shapes. Coupled with the knowledge of stencil thickness there is now adequate information to inspect solder paste prints.

Embodiments of the present invention generally provide a system and method for collecting images of a solder paste printing stencil and automatically generating solder paste inspection information. The solder paste inspection information is then used during the solder paste deposition process to verify correct solder paste deposit locations, size and/or shapes. A method for accurately measuring solder paste printing stencil apertures is also disclosed in order to generate the programming inputs to a solder paste inspection system.

In accordance with one embodiment, two views are used; an upward view and a downward view, to see the stencil and an alignment target, respectively. The alignment target is any suitable device placed in the position of a printed circuit board that has suitable surface indicia that machine vision algorithms can generate the positional references with suitable precision. In some embodiments, the alignment target could even be a printed circuit board. The imaging device is preferably set up to acquire images of both views simultaneously (or at least with known offset positions). During manufacture, the imaging device may be calibrated by viewing alignment targets placed above and below the camera (at the stencil and PCB positions). Calibration of the imaging device provides information about the relative alignment of the look-up and look-down images.

Figure 2:
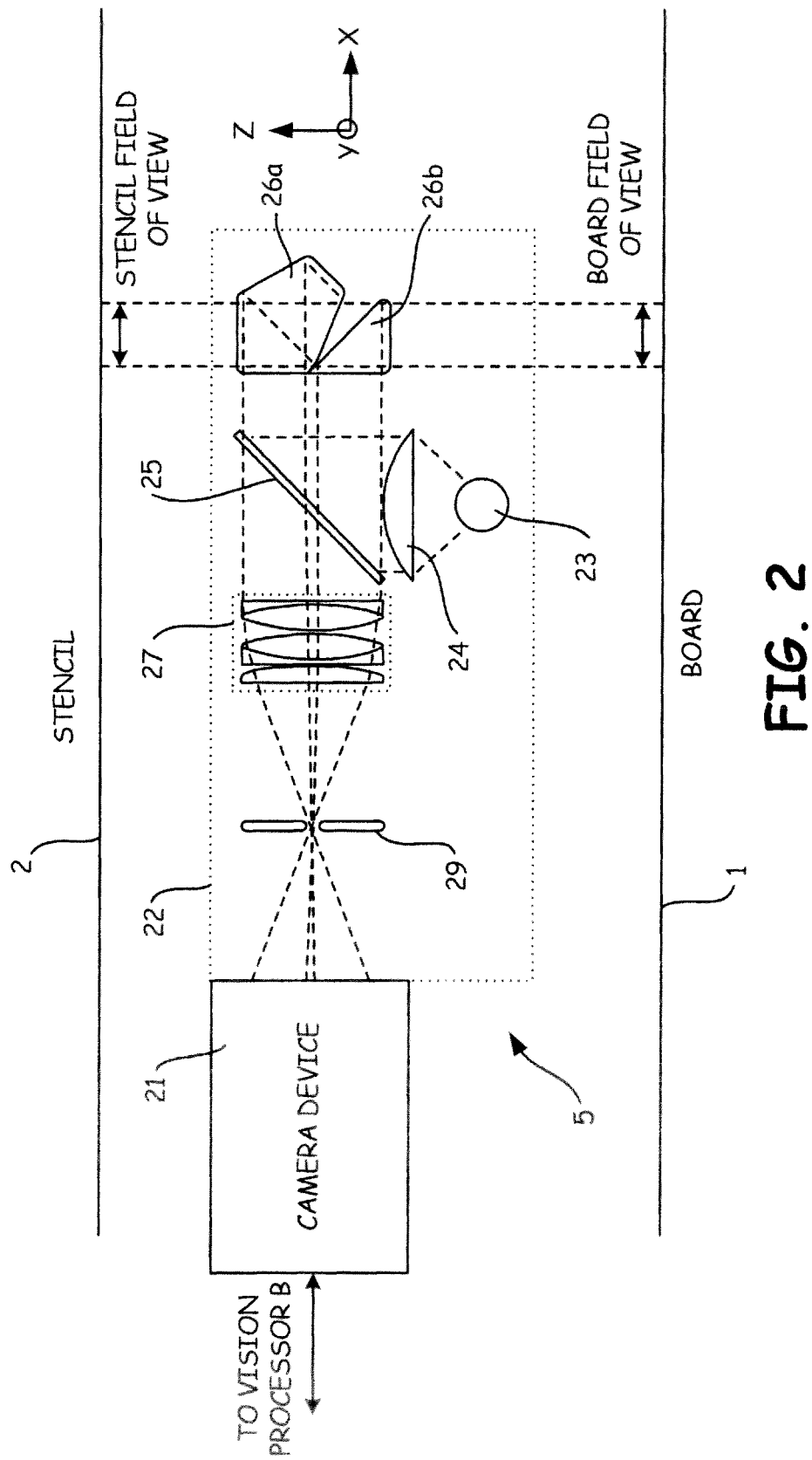
FIG. 2 is an elevation view of an imaging device suitable for viewing both the stencil and printed circuit board simultaneously, in accordance with an embodiment of the present invention.

FIG. 2 is a diagrammatic view of an image acquisition system suitable for viewing both the stencil and printed circuit board simultaneously. In the arrangement shown in FIG. 2, a single camera is used to acquire both upward and downward views. However, embodiments of the present invention can also be practiced where a plurality of cameras are used to acquire respective images. Imaging device 5 includes camera 21 coupled to illuminator/optics unit 22. Unit 22 includes stop 29 disposed at a convergence point of lens assembly 27. An illuminator, such as an LED or strobe light, 23 is provided proximate lens 24, which collimates illumination diverging from point source 23. The collimated illumination is reflected by partial mirror 25 to prisms 26a and 26b thereby illuminating stencil 2 and board 1, respectively. Images from the stencil field of view and the board field of view are acquired by camera 21 through prisms 26a and 26b, respectively, and through lens assembly 27. In order to provide the requisite positional precision, an alignment target can be placed in the position of board 1, and include features having known positions that are identifiable using machine vision techniques. The alignment target may be either a specially marked artifact or it may be the printed circuit board to be printed (matching the stencil to be scanned). However, in some embodiments, one or more motion encoders of sufficient precision can be coupled to imaging device 5 such that relative motion between imaging device 5 and stencil 2 can simply be measured or otherwise determined directly.

Figure 3:
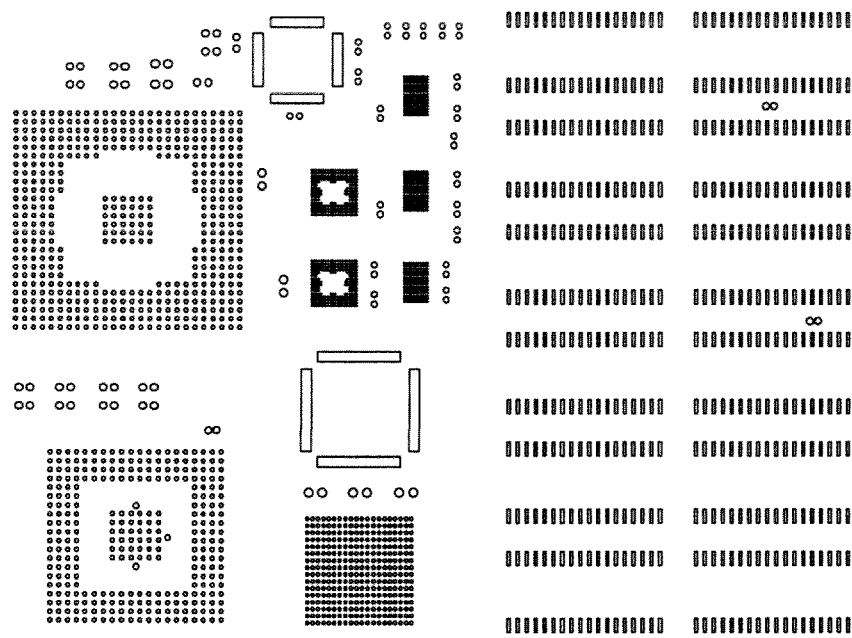
FIG. 3 is an image of a segment of a solder paste stencil.
Figure 3:
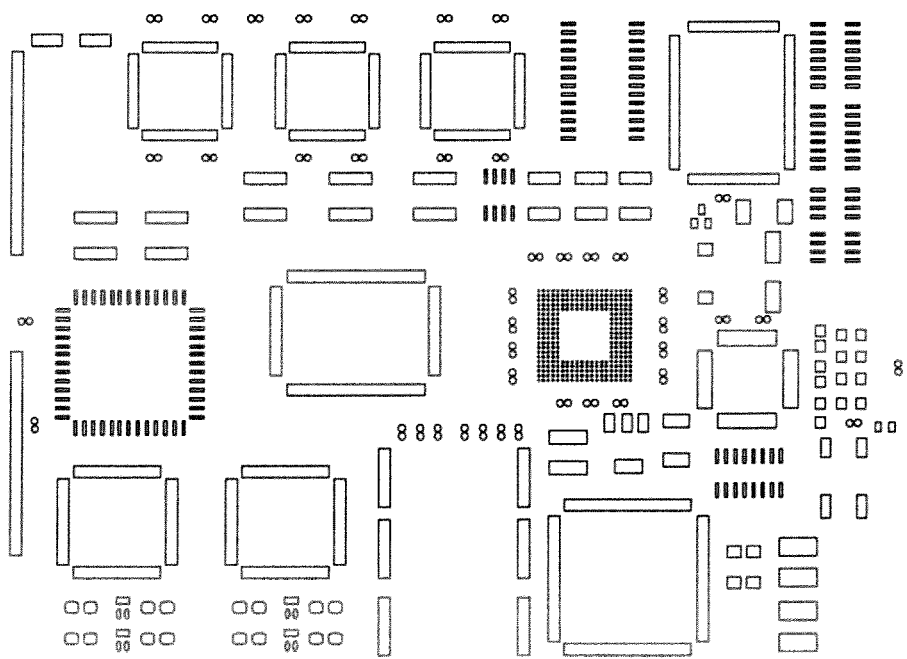

FIG. 3 is an image of a segment of a solder paste stencil. Black regions indicate holes, or apertures, in the stencil through which solder paste is applied to the printed circuit board. Note that there is a large gap between sections of the board. Image mosaicking software has great difficulties aligning these featureless areas making it problematic to generate the solder paste inspection CAD by only imaging the stencil. In one embodiment, an image set (images of all areas of the stencil of interest) of both stencil and alignment target are captured or otherwise acquired. The stencil images allow measurement of aperture size and shape, but the absolute positions of the apertures are only poorly known due to imprecise motion in current solder paste printer camera motion control systems. Solder paste inspection systems must accurately determine the location of solder paste deposits to a precision much smaller than the dimensions of the apertures. Accordingly, it may also be impossible to uniquely identify stencil apertures (as the imprecision of the camera robot may be greater than the spacing between the apertures).

In accordance with an embodiment of the present invention, the set of all stencil images is used to generate a mosaic image of the entire stencil where individual apertures could be extracted. Some image processing toolkits support this operation (e.g. MVTec's Halcon tool "Calibrated Mosaicking" feature). However, this sort of image based mosaic generation requires that the images contain discernible features (either marks or texture) in the image overlap areas. If a significant fraction of the image overlaps have no features then the mosaic generation will fail. Solder paste printing stencils are typically made from thin sheets of metal, a material without any useful texture. Instead of trying to create a mosaic image of just the stencil, embodiments of the present invention can create mosaic images of both the stencil and the alignment target. The alignment target images provide features or texture allowing precise mosaicking of the downward camera images. The known relationship between the upward camera and the downward camera allows precise mosaicking of the upward camera images. Once a geometrically correct mosaic image of the stencil has been created, the aperture information may be automatically extracted to provide solder paste inspection information. This solder paste inspection information is then used during and/or after solder paste deposition to verify correct position, size and/or shape of individual solder paste deposits. Providing a technique that can extract aperture position information directly from the images without requiring a complex motion control/encoder system significantly reduces the overall cost of the solder paste printing system.

As set forth above, the alignment target may take various forms as long as it has suitable characteristics for the purpose. For example, the alignment target may be a special purpose artifact with calibrated markings readable by the downward camera. This would allow absolute measurement of locations. Alternatively the alignment target could be a printed circuit board that is printed as an alignment target, where the top surface of a PCB has features and texture which may easily be aligned by mosaicking software. Additionally, the PCB may have features which match the apertures in the stencil (i.e. pads on the PCB match apertures in the stencil); this further aids alignment of the upward view and the downward view.

Figure 4:
FIG. 4 is an enlarged view of a small region from the upper right corner of FIG. 3.
Figure 4:
Figure 4:
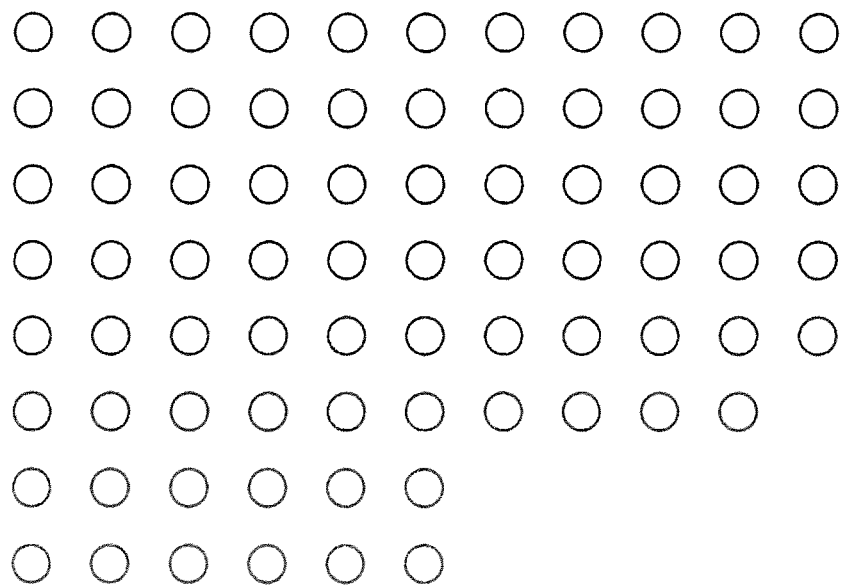
Figure 5:
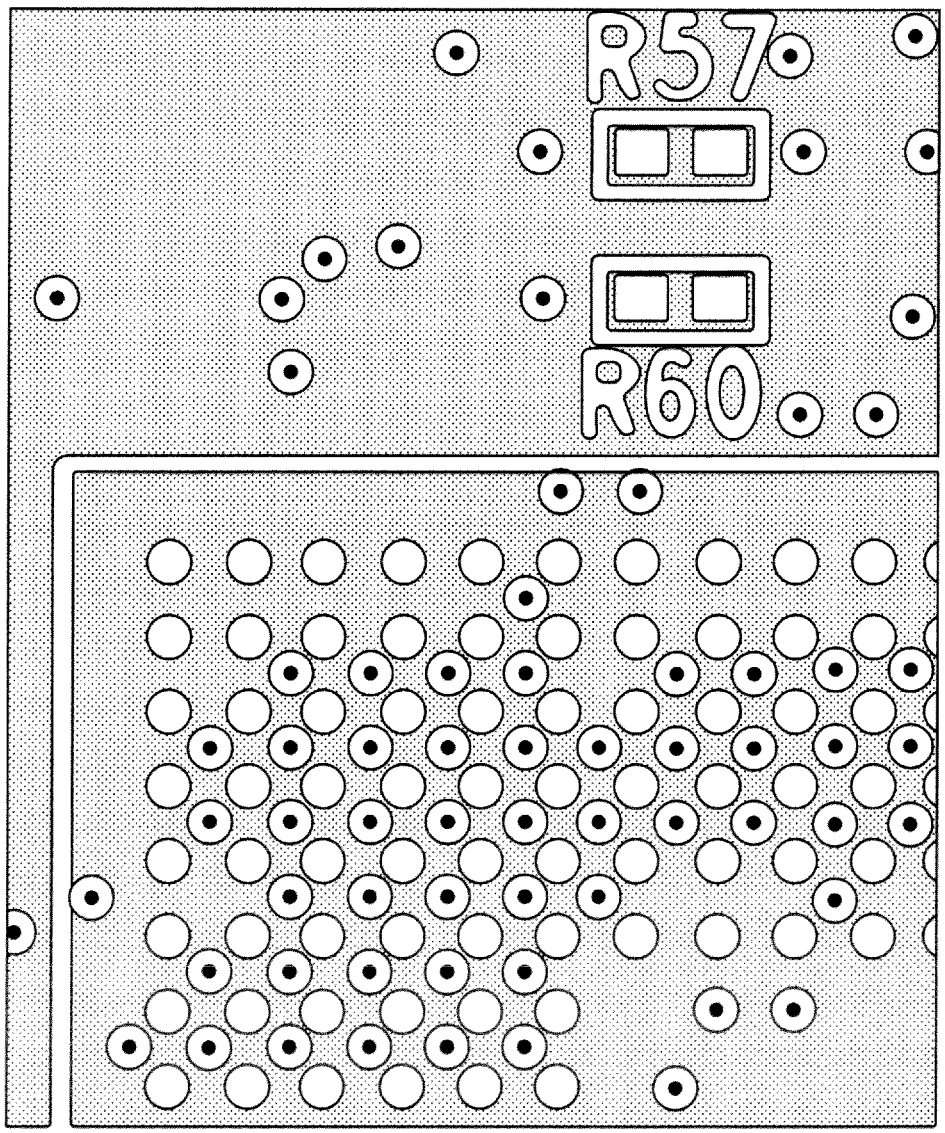
FIG. 5 is an image of a PCB surface corresponding to the stencil region of FIG. 4.

FIG. 4 is a small region from the upper right corner of FIG. 3. The apertures are very close together and similar to each other, image mosaicking software is easily deceived by repetitive patterns. FIG. 5 is an image of a PCB surface corresponding to the stencil region of FIG. 4. The image is much richer in content than FIG. 4. Image mosaicking software has many features to use in alignment (e.g. letter screen, traces, solder mask apertures, and texture on the surface of the board).

Figure 6:
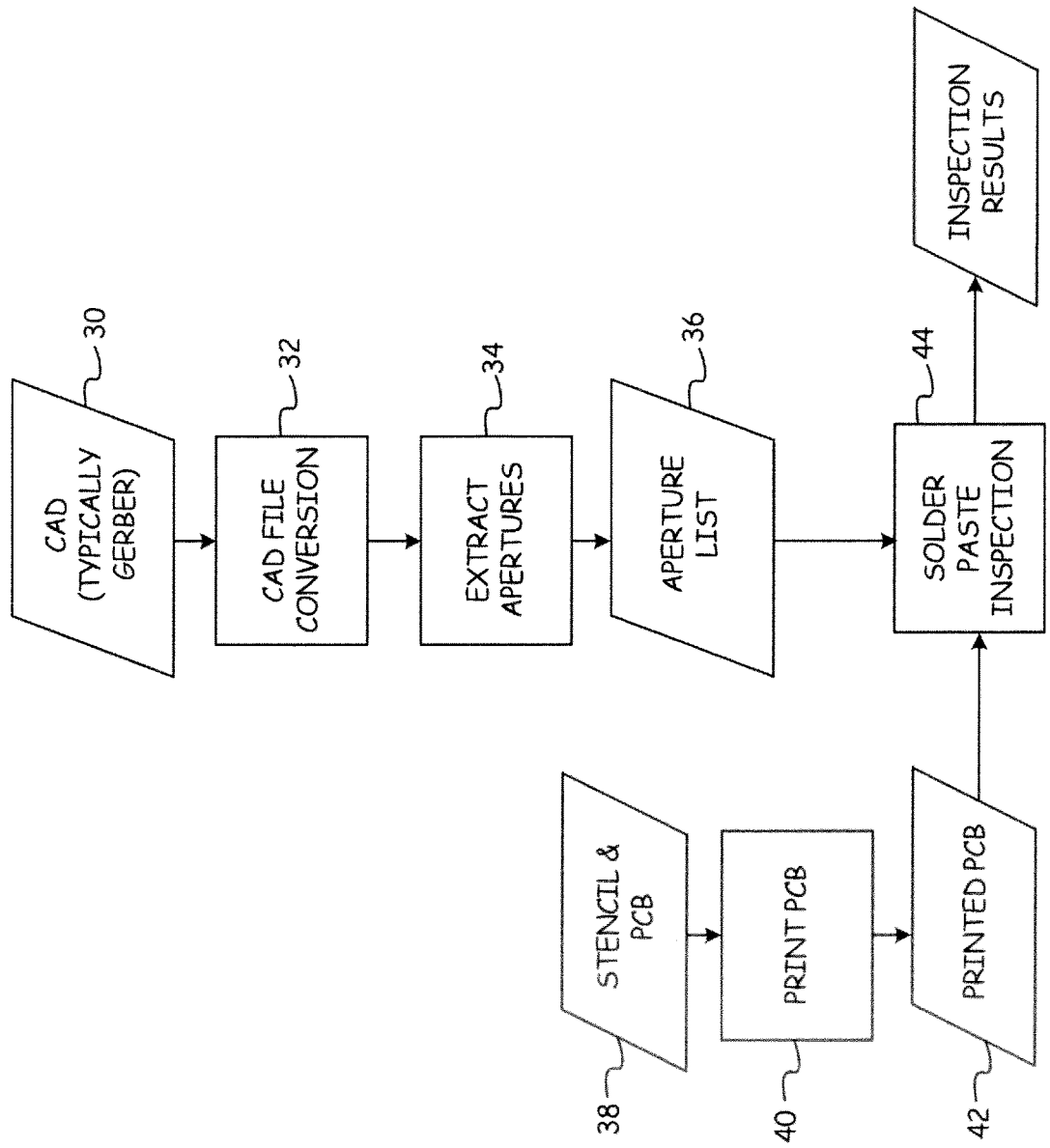
FIG. 6 is a flow chart of a method for extracting aperture information from the CAD data.

FIG. 6 is a flow chart for extracting aperture information from the CAD data. Problems may be introduced by: Missing or corrupted CAD files; Incompatible CAD file data format; User errors during the translation process; User programming errors during creation of a multi-circuit stencil (since the CAD data typically only contains aperture data for a single circuit); and a CAD file for the wrong printed circuit board. Typically, a CAD file is supplied, as indicated at block 30. This file may be in a variety of different known CAD file formats, but is typically a Gerber file. A Gerber file is a two-dimensional bi-level vector image description format. Such formats are used to describe or otherwise specify features on a printed circuit board, such as lands, traces, holes, printing, solder mask, et cetera. At block 32, the CAD file is converted or otherwise processed into a format suitable for extracting data. Next, at block 34, the solder paste stencil aperture information is extracted. The extracted aperture information is loaded and stored in an aperture list, as indicated at block 36. Creation of the aperture list need only happen once, unless there is a change to the board design. Each time a production run of a particular printed circuit board design is carried out, the aperture list (if previously extracted) may be reloaded.

During printed circuit board manufacture, the stencil and printed circuit board are provided, as indicated at block 38. The printed circuit board is then set in place within the solder paste printer and the stencil is laid over the board as the solder paste is printed onto the board, as indicated at block 40. The printed circuit board is then conveyed or otherwise transported, as indicated at block 42, to a solder paste inspection step, as indicated at block 44.

Figure 7:
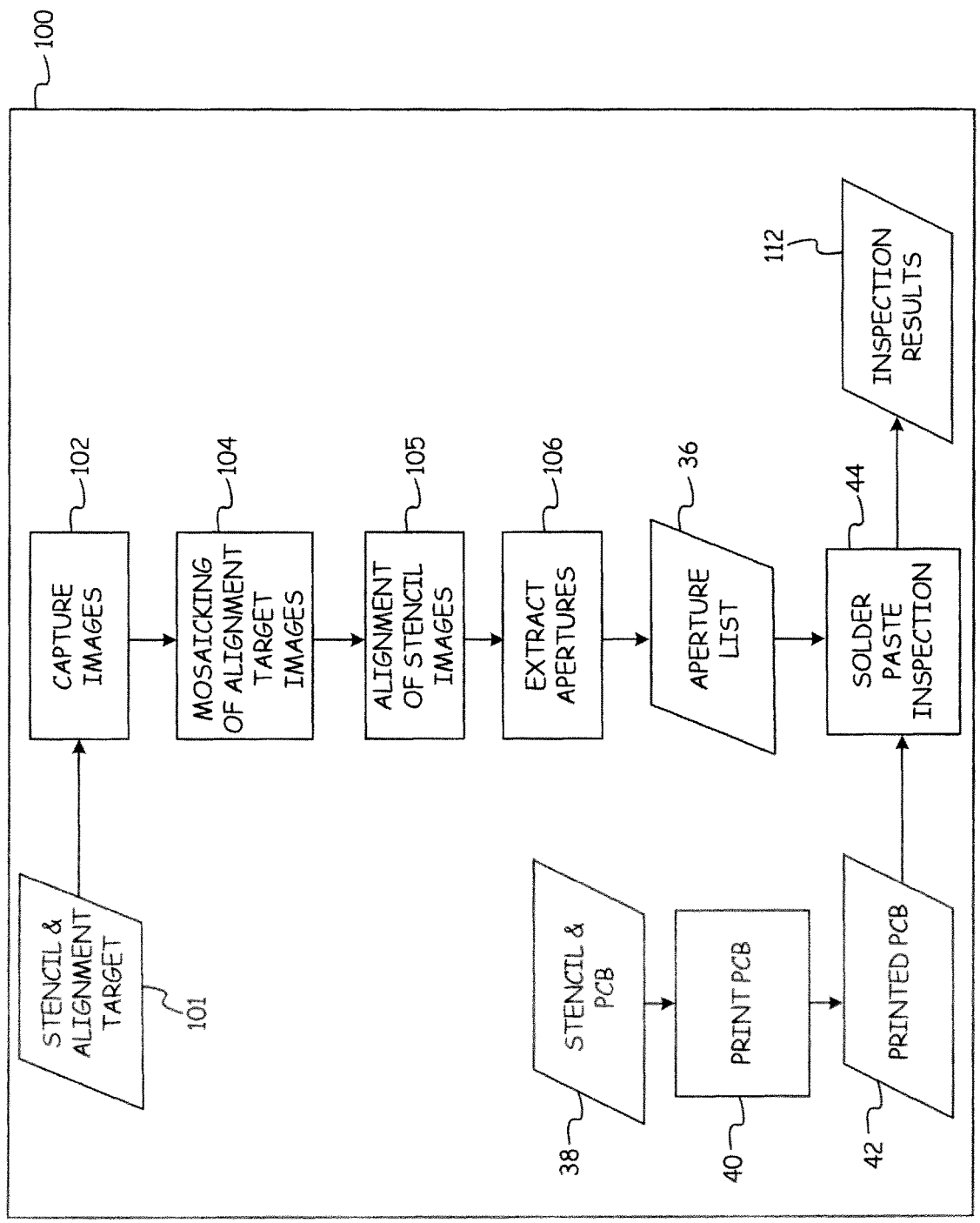
FIG. 7 is a flow chart of a method for extracting aperture information from the solder paste stencil itself, in accordance with an embodiment of the present invention.

FIG. 7 is a flow chart for extracting aperture information from the stencil itself in accordance with an embodiment of the present invention. By extracting the aperture data directly from the physical stencil all of the pitfalls of the CAD conversion technique are avoided. Method 100 also requires a stencil and printed circuit board, the printing of the solder paste and conveying the board are the same as for the method described with respect to FIG. 6, thus FIG. 7 includes blocks 36, 38, 40, 42 and 44. However, method 100 captures images of the stencil and alignment target 101, as indicated at block 102, using a suitable imaging device, such as that described with respect to FIG. 2. As described, the alignment target may be a printed circuit board, if the alignment target is the same printed circuit board intended for printing then block 101 is identical to block 38. The images acquired at block 102 are mosaicked at block 104 and 105. At block 104, the images of the alignment targets are mosaicked. At block 105, the stencil images are mosaicked based on the data provided at block 104. As set forth above, the mosaic preferably includes feature-rich images of the alignment target or printed circuit board from the downward camera. The fixed physical relationship between the upward camera and the downward camera ensures that once the mosaic is completed, that positions of features in the stencil can be correlated directly to positions on the printed circuit board, as indicated in block 105. Alternatively, blocks 104 and 105 can be combined into a single mosaicking step where information from both upward and downward camera images are used to simultaneously optimize the mosiack images. Next, at block 106, the aperture information is extracted from the acquired images and mosaic. Aperture features are extracted using the well-known image processing tools of blob detection and connected components. These tools are part of many image processing libraries (e.g. MVTec's Halcon 'connection', 'blob analysis', and 'morphology' tools). This aperture information includes the size, shape and position of each aperture through the stencil. At this time, any fiducial marks on the printed circuit board may be found and added to the aperture list. At block 36, the aperture list is stored and/or provided to a solder paste inspection machine. The aperture list need only be computed once for a particular printed circuit board design; it is stored and reused every time the board type is assembled. The solder paste inspection is carried out at block 44 on the printed circuit board and/or subsequent printed circuit boards that have been printed with the stencil. As set forth above, this aperture list need only be computed or otherwise generated once and stored. Thus, any time a printed circuit board is to be processed using the stencil, the aperture information can be retrieved and used to automatically configure the solder paste inspection machine. At block 112, the inspection results are provided. This includes providing a pass/fail indication to a technician via a suitable display, which is typically part of solder paste inspection systems.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A system comprising:
   a solder paste printer configured to print solder paste on a circuit board based on a solder paste stencil, the solder paste printing occurring at a solder paste printing location;
   at least one camera configured to acquire images of the stencil and an alignment target;
   a motion system to generate relative motion between the at least one camera and the stencil, wherein the relative motion translates the image of the stencil and image of the alignment target equally, wherein the motion system is less accurate than a required accuracy for directly correlating motion system position with stencil aperture positions;
   a vision processor being configured to analyze the images and stitch a mosaic image of the stencil, based on images of the alignment target, the mosaic image containing aperture information;
   an image processor configured to extract the aperture information from the mosaic image;
   a solder paste inspection station spaced from the solder paste printing location, the solder paste inspection station being configured to:
      receive the extracted aperture information from the image processor,
      receive a printed circuit board, and
      inspect solder paste deposits on the printed circuit board based on the extracted aperture information; and
   a transport mechanism configured to transport the board from the solder paste printing location to the solder paste inspection station after solder paste printing.

2. The system of claim 1, wherein the motion system is less accurate than dimensions of the smallest stencil aperture.

3. The system of claim 1, wherein the at least one camera consists of a single camera configured to sequentially acquire the image of the alignment target and the image of the stencil.

4. The system of claim 1, wherein the alignment target is a printed circuit board.

5. A system for measuring solder paste stencil aperture positions and sizes within a solder paste printer, the system comprising:
   a first camera configured to view the stencil;
   a second camera fixedly mounted relative to the first camera and configured to view an alignment target, the second camera having a known positional relationship to the first camera;
   a motion system configured to generate relative motion between the first and second cameras and the stencil, wherein the motion system is less accurate than a required accuracy for directly correlating motion system position with stencil aperture positions; and
   a vision processor coupled to the first and second cameras, the vision processor being configured to capture, simultaneously, images from the first and second cameras, and to stitch a mosaic image of the stencil from the images captured by the first camera based at least in part on images captured by the second camera, wherein the mosaic image of the stencil is larger than a single image captured by the first camera; and
   an image processor configured to process the mosaic image of the stencil to extract aperture information from the stitched mosaic image and to provide the aperture information to a solder paste inspection system, the aperture information containing solder paste inspection information.

6. The system of claim 5 wherein the alignment target is a circuit board.

7. A method of automatically mosaicking a series of images acquired of a stencil within a solder paste printer, the method comprising:
   acquiring a set of overlapping images of the stencil;
   acquiring a set of overlapping images of an alignment target having more details than the stencil, the alignment target having a fixed relationship relative to the stencil and wherein an orientation between the two sets of images is known accurately;
   mosaicking the set of alignment target images;
   mosaicking the set of stencil images based at least in part on the mosaicked alignment target image;
   calculating stencil aperture information based on the known orientation and mosaicked set of stencil images; and
   automatically programming a solder paste inspection machine remote from the solder paste printer based on the calculated stencil aperture information obtained from the mosaicked set of stencil images.

8. The method of claim 7, and further comprising generating an aperture list based on the extracted stencil aperture information.

9. The method of claim 7, wherein the images of the stencil and the images of the alignment target are acquired by the same camera.

10. The method of claim 7, wherein the stencil and the alignment target have a fixed positional relationship relative to each other.

11. The method of claim 7, and further comprising calibrating an image acquisition device to determine relative alignment between the set of images of the stencil and the set of images of the alignment target.

12. The method of claim 7, wherein the alignment target is a printed circuit board.

13. The method of claim 7, wherein the alignment target images and the stencil images are mosaicked simultaneously.

14. The system of claim 1, wherein the vision processor is further configured to detect and correct motion system imprecision.

15. The system of claim 1, wherein the images of the alignment target used by the vision processor to generate the mosaic stencil image contain overlapping features.

16. The system of claim 1, wherein the aperture information includes aperture positions and sizes.

17. The system of claim 1, wherein the aperture information includes aperture shape.

* * * * *